United States Patent
Quan et al.

(10) Patent No.: US 11,268,429 B2
(45) Date of Patent: *Mar. 8, 2022

(54) DIFFUSION SURFACE ALLOYED METAL EXHAUST COMPONENT WITH INWARDLY TURNED EDGES

(71) Applicant: Tenneco Automotive Operating Company Inc., Lake Forest, IL (US)

(72) Inventors: Guangchun Quan, Ann Arbor, MI (US); Michael Golin, Dexter, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 372 days.

This patent is subject to a terminal disclaimer.

(21) Appl. No.: 16/250,388

(22) Filed: Jan. 17, 2019

(65) Prior Publication Data

US 2020/0232377 A1 Jul. 23, 2020

(51) Int. Cl.
*F01N 13/16* (2010.01)
*F01N 13/08* (2010.01)
(Continued)

(52) U.S. Cl.
CPC ............ *F01N 13/16* (2013.01); *B32B 15/011* (2013.01); *C22C 38/18* (2013.01); *C23C 10/04* (2013.01);
(Continued)

(58) Field of Classification Search
None
See application file for complete search history.

(56) References Cited

U.S. PATENT DOCUMENTS 1,280,386 A   10/1918   Buehner
1,512,961 A   10/1924   Weil
(Continued)

FOREIGN PATENT DOCUMENTS

CN   101413419 A   4/2009
CN   102230407 A   11/2011
(Continued)

OTHER PUBLICATIONS

International Search Report and Written Opinion regarding PCT/US2018/064897, dated Mar. 21, 2019, 10 pages.
(Continued)

*Primary Examiner* — Xiaobei Wang
(74) *Attorney, Agent, or Firm* — Harness, Dickey & Pierce, P.L.C.

(57) ABSTRACT

An exhaust component for a motor vehicle with improved corrosion resistance, including a housing with outer walls that define an internal volume and one or more inner walls that divide the internal volume into an exhaust chamber and an interior chamber. The interior chamber is isolated from the exhaust chamber and the external environment. At least part of one outer wall or one inner wall is made of a diffusion surface alloyed metal sheet. The diffusion surface alloyed metal sheet comprises a secondary metal that is formed to a primary metal substrate by diffusion. The diffusion surface alloyed metal sheet includes edges that are oriented toward and exposed to the interior chamber. As a result, the primary metal substrate at the edges of the diffusion surface alloyed metal sheet is protected from exposure to corrosives such as salt spray in the external environment and urea in the exhaust chamber respectively.

15 Claims, 4 Drawing Sheets

(51) Int. Cl.

| | | |
|---|---|---|
| *F01N 13/18* | (2010.01) | |
| *B32B 15/01* | (2006.01) | |
| *F01N 3/24* | (2006.01) | |
| *C23C 10/04* | (2006.01) | |
| *C22C 38/18* | (2006.01) | |
| *C23C 10/32* | (2006.01) | |

(52) U.S. Cl.
CPC .............. *C23C 10/32* (2013.01); *F01N 3/24* (2013.01); *F01N 13/08* (2013.01); *F01N 13/1888* (2013.01); *F01N 2530/04* (2013.01); *F01N 2530/26* (2013.01); *Y10T 428/12958* (2015.01)

(56) References Cited

U.S. PATENT DOCUMENTS

| | | | |
|---|---|---|---|
| 2,323,955 | A | 7/1943 | Wilson |
| 2,692,025 | A | 10/1954 | Hamilton |
| 2,940,249 | A | 6/1960 | Gospodar |
| 2,975,072 | A | 3/1961 | Bryant |
| 3,072,214 | A | 1/1963 | Deremer |
| 3,109,510 | A | 11/1963 | Phelan |
| 3,209,858 | A | 10/1965 | Jettinghoff |
| 3,209,860 | A | 10/1965 | Lentz |
| 3,209,862 | A | 10/1965 | Young |
| 3,337,939 | A | 8/1967 | Parkinson |
| 3,388,769 | A | 6/1968 | Martoia |
| 3,420,052 | A | 1/1969 | Miller |
| 3,512,607 | A | 5/1970 | Hubbell, III |
| 3,583,524 | A | 6/1971 | Dubois |
| 3,623,901 | A | 11/1971 | Forstmann et al. |
| 3,643,760 | A | 2/1972 | Hubbell, III |
| 3,709,320 | A | 1/1973 | Hollerl et al. |
| 3,768,987 | A | 10/1973 | Forstmann et al. |
| 3,794,139 | A | 2/1974 | Hetherington et al. |
| 3,827,529 | A | 8/1974 | Frietzsche et al. |
| 3,949,829 | A | 4/1976 | Honda et al. |
| 4,064,963 | A | 12/1977 | Kaan et al. |
| 4,209,076 | A | 6/1980 | Franco et al. |
| 4,359,865 | A | 11/1982 | Nakao et al. |
| 4,756,437 | A | 7/1988 | Rossi-Mossuti |
| 4,909,348 | A | 3/1990 | Harwood et al. |
| 5,052,513 | A | 10/1991 | Yoshikawa et al. |
| 5,168,132 | A | 12/1992 | Beidl et al. |
| 5,265,420 | A | 11/1993 | Rutschmann |
| 5,321,214 | A | 6/1994 | Uegane et al. |
| 5,403,557 | A * | 4/1995 | Harris .................. B04C 3/06 422/169 |
| 5,530,213 | A | 6/1996 | Hartsock et al. |
| 5,593,645 | A | 1/1997 | Steenackers et al. |
| 5,907,135 | A | 5/1999 | Hayakawa et al. |
| 6,341,664 | B1 | 1/2002 | Gerber |
| 6,598,581 | B2 | 7/2003 | Kempf |
| 6,726,957 | B2 | 4/2004 | Niemiec |
| 6,830,847 | B2 | 12/2004 | Ramaswami et al. |
| 6,889,499 | B2 * | 5/2005 | Bassani .................. F01N 1/003 60/312 |
| 7,001,675 | B2 | 2/2006 | Chan |
| 7,051,523 | B2 | 5/2006 | Kerchner |
| 7,377,359 | B2 | 5/2008 | Hofmann et al. |
| 7,506,723 | B2 | 3/2009 | Hoerr et al. |
| 7,637,349 | B2 | 12/2009 | Harada |
| 7,669,693 | B2 | 3/2010 | Yamaguchi et al. |
| 7,789,195 | B2 | 9/2010 | Mabuchi et al. |
| 7,874,401 | B2 | 1/2011 | Uhlemann et al. |
| 7,942,239 | B2 | 5/2011 | Huff et al. |
| 7,967,107 | B2 | 6/2011 | Han et al. |
| 8,292,026 | B2 | 10/2012 | Tauschek et al. |
| 8,402,756 | B2 | 3/2013 | Luce et al. |
| 8,557,397 | B2 | 10/2013 | Bullard et al. |
| 8,628,861 | B2 | 1/2014 | Bullard et al. |
| 8,684,131 | B1 | 4/2014 | Park et al. |
| 8,827,035 | B2 | 9/2014 | Ross et al. |
| 9,067,282 | B2 | 6/2015 | Sharp |
| 9,095,932 | B2 | 8/2015 | Miller et al. |
| 9,096,035 | B2 | 8/2015 | Sachdev et al. |
| 9,109,482 | B2 | 8/2015 | Fritz et al. |
| 9,121,320 | B2 | 9/2015 | Carr et al. |
| 9,341,102 | B2 | 5/2016 | Ross et al. |
| 9,393,759 | B2 | 7/2016 | Luo et al. |
| 9,429,052 | B2 | 8/2016 | Horr |
| 9,623,515 | B2 | 4/2017 | Breuer et al. |
| 9,689,301 | B2 | 6/2017 | Carr et al. |
| 9,862,058 | B2 | 1/2018 | Breuer et al. |
| 2005/0115764 | A1 | 6/2005 | Mabuchi et al. |
| 2006/0162995 | A1 | 7/2006 | Schorn et al. |
| 2006/0231330 | A1 | 10/2006 | Morales et al. |
| 2007/0102236 | A1 | 5/2007 | Uhlemann et al. |
| 2007/0227807 | A1 | 10/2007 | Meneely et al. |
| 2007/0251761 | A1* | 11/2007 | Nishimura ............... F01N 1/14 181/258 |
| 2008/0093161 | A1 | 4/2008 | Winkel et al. |
| 2008/0093162 | A1 | 4/2008 | Marocco et al. |
| 2008/0196969 | A1 | 8/2008 | Henke et al. |
| 2009/0000862 | A1 | 1/2009 | Buell et al. |
| 2009/0229913 | A1 | 9/2009 | Tonietto et al. |
| 2009/0249603 | A1 | 10/2009 | Vargas |
| 2010/0270103 | A1* | 10/2010 | Huff ......................... F01N 1/02 181/266 |
| 2011/0083924 | A1 | 4/2011 | Park |
| 2011/0272209 | A1* | 11/2011 | Tauschek ............ F01N 13/1844 181/228 |
| 2013/0171471 | A1* | 7/2013 | Bullard ................. B05D 3/0254 428/683 |
| 2013/0206271 | A1 | 8/2013 | Wieser et al. |
| 2013/0213734 | A1 | 8/2013 | Ahn et al. |
| 2014/0027414 | A1 | 1/2014 | Lin et al. |
| 2014/0144721 | A1 | 5/2014 | Park |
| 2014/0151149 | A1 | 6/2014 | Ross et al. |
| 2015/0008068 | A1 | 1/2015 | Hamashima et al. |
| 2015/0354421 | A1* | 12/2015 | Horr ...................... F01N 1/166 181/241 |
| 2016/0340786 | A1 | 11/2016 | Mukai et al. |
| 2017/0080523 | A1 | 3/2017 | Andersson et al. |
| 2017/0218831 | A1* | 8/2017 | DeVouge .............. F01N 13/1844 |
| 2019/0321914 | A1 | 10/2019 | Denney et al. |
| 2020/0232376 | A1 | 7/2020 | Quan |
| 2020/0232377 | A1 | 7/2020 | Quan et al. |

FOREIGN PATENT DOCUMENTS

| | | |
|---|---|---|
| CN | 103603707 A | 2/2014 |
| CN | 204163804 U | 2/2015 |
| CN | 103014694 B | 4/2015 |
| CN | 204851384 U | 12/2015 |
| CN | 105813837 A | 7/2016 |
| CN | 205840974 U | 12/2016 |
| CN | 106285879 A | 1/2017 |
| DE | 2706957 A1 | 8/1978 |
| DE | 2856889 A1 | 11/1980 |
| DE | 2839756 C2 | 8/1984 |
| DE | 102004039006 A1 | 2/2006 |
| DE | 102013106651 A1 | 1/2015 |
| EP | 0047678 A1 | 3/1982 |
| EP | 0328056 A2 | 8/1989 |
| EP | 0523008 B1 | 9/1996 |
| EP | 0808877 B1 | 9/2003 |
| EP | 1918544 A1 | 5/2008 |
| EP | 3112654 A1 | 1/2017 |
| GB | 1393232 A | 5/1975 |
| JP | S6338524 B2 | 8/1988 |
| JP | S63285213 A | 11/1988 |
| JP | 10296090 A | 11/1998 |
| JP | H11140665 A | 5/1999 |
| JP | 2000337126 A | 12/2000 |
| JP | 2006144707 A | 6/2006 |
| JP | 3853903 B2 | 12/2006 |
| JP | 2007308737 A | 11/2007 |
| JP | 2009072695 A | 4/2009 |
| JP | 2009215941 A | 9/2009 |
| JP | 2010255520 A | 11/2010 |
| JP | 2011027038 A | 2/2011 |

(56) References Cited

FOREIGN PATENT DOCUMENTS

| | | | |
|---|---|---|---|
| JP | 2011085113 | A | 4/2011 |
| JP | 4691707 | B2 | 6/2011 |
| JP | 5335595 | B2 | 11/2013 |
| JP | 2013238160 | A | 11/2013 |
| JP | 5529839 | B2 | 6/2014 |
| JP | 2015063985 | A | 4/2015 |
| JP | 5992768 | B2 | 9/2016 |
| JP | 6443138 | B2 | 12/2018 |
| KR | 100797823 | B1 | 1/2008 |
| KR | 20090071167 | A | 7/2009 |
| KR | 101262612 | B1 | 5/2013 |
| WO | WO-2016206915 | A1 | 12/2016 |
| WO | 201750711 | A1 | 3/2017 |

OTHER PUBLICATIONS

CA Office Action regarding Chinese Patent Application No. 202010032630.2, dated Jul. 27, 2021.

* cited by examiner

DIFFUSION SURFACE ALLOYED METAL EXHAUST COMPONENT WITH INWARDLY TURNED EDGES

FIELD

The present disclosure relates generally to exhaust components for motor vehicles and more particularly to exhaust components made of diffusion surface alloyed metals.

BACKGROUND

The statements in this section merely provide background information related to the present disclosure and may not constitute prior art.

Motor vehicles typically have an exhaust system that transports hot exhaust gases from an internal combustion engine powering the motor vehicle to the outside environment. Such exhaust systems are typically comprised of various exhaust components, including without limitation, headers, down pipes, x-pipes, exhaust pipes, and mufflers. Depending on the type of fuel source used to power the internal combustion engine in the motor vehicle (e.g., gasoline versus diesel), the exhaust system may include additional exhaust components that provide emissions control, including without limitation, catalytic converters, urea injectors, selective catalytic reduction (SCR) units, diesel oxidation catalysts (DOC), and diesel particulate filters (DPF). Traditionally, these exhaust components have been made from cast iron or steel. These materials work well in high temperature applications, but suffer drawbacks associated with long-term corrosion. The exhaust components of a typical motor vehicle operate in a highly corrosive environment and are prone to corrosion from both the outside and the inside. Exhaust components are typically mounted on the exterior of a motor vehicle, usually underneath the vehicle body and therefore have external surfaces that are exposed to water and salt spray from roadways treated with salt during the winter months. The internal surfaces of an exhaust component are exposed to exhaust gases, which in addition to water vapor, can include urea from a urea injector. The urea, which is used by emission control subsystems, creates a corrosive environment inside the exhaust component.

Today, vehicle manufacturers have different requirements for various exhaust components to help resist corrosion. For instance, the outside surface of certain exhaust components must pass salt spray testing, while the inside surface of some diesel engine exhaust components must pass urea corrosion testing. Some alternatives to cast iron and steel have been developed that use coatings or surface cladding to reduce corrosion. High cost alloys and stainless steels have also been developed that offer improved corrosion resistance to salt and urea. However, other cost effective alternatives with improved corrosion resistance are still needed.

SUMMARY

This section provides a general summary of the disclosure, and is not a comprehensive disclosure of its full scope or all of its features.

In accordance with an aspect of the present disclosure, an exhaust component for a motor vehicle with improved corrosion resistance is provided. The exhaust component includes a housing with one or more outer walls that define an internal volume. The one or more walls have an inside surface facing the internal volume of the housing and an outside surface facing an external zone, which is positioned outside the housing. The exhaust component further includes one or more inner walls positioned in the internal volume of the housing that divide the internal volume into an exhaust chamber and an interior chamber. The interior chamber inside the housing is isolated from the external zone by the one or more outer walls. The interior chamber is also isolated from the exhaust chamber by the one or more inner walls in the housing. At least part of one of the outer walls or one of the inner walls is made of a diffusion surface alloyed metal sheet. The diffusion surface alloyed metal sheet comprises a secondary metal that is formed to a primary metal substrate by diffusion. The diffusion surface alloyed metal sheet includes one or more edges that are oriented toward and exposed to the interior chamber. As a result, the one or more edges of the diffusion surface alloyed metal sheet are protected from exposure to the external zone and the exhaust chamber.

Cutting and/or other manufacturing operations leave the primary metal substrate of the diffusion surface alloyed metal sheet exposed along one or more edges. Because the one or more edges of the diffusion surface alloyed metal sheet are oriented toward and exposed to the interior chamber, the edges are isolated from the external zone and the exhaust chamber and therefore are not exposed to salt spray and/or urea. This prevents salt and/or urea from corroding the primary metal substrate at the edges of the diffusion surface alloyed metal, which would otherwise be exposed absent this arrangement. In other words, salt spray and/or urea can only come in contact with the corrosion resistant secondary metal of the diffusion surface alloyed metal sheet(s) used in the exhaust component of the present disclosure.

In accordance with another aspect of the present disclosure, the exhaust component further includes inlet and outlet conduits connected to the housing. At least part of the outer wall is made of a diffusion surface alloyed metal sheet. One or more edges of the diffusion surface alloyed metal sheet are oriented toward and exposed to the internal volume such that the one or more edges of the diffusion surface alloyed metal sheet are protected from exposure to the external zone outside the housing. This prevents salt from corroding the primary metal substrate at the edges of the diffusion surface alloyed metal, which would otherwise be exposed absent this arrangement. In other words, salt spray can only come in contact with the corrosion resistant secondary metal on the outside surface of the exhaust component.

In accordance with yet another aspect of the present disclosure, at least part of the outer wall and at least part of the inner wall are made of one or more diffusion surface alloyed metal sheets. Each diffusion surface alloyed metal sheet includes one or more edges that are oriented toward and exposed to the interior chamber. Accordingly, the edges of each diffusion surface alloyed metal sheet are protected from exposure to the external zone and the exhaust chamber. Where parts of both the outer wall and the inner wall are made of diffusion surface alloyed metal sheets, the secondary metal on each respective diffusion surface alloyed sheet can be selected to resist the different corrosive environments in the external zone versus the exhaust chamber. For example, the diffusion surface alloyed metal sheet forming at least part of the outer wall can include a core layer made of a primary metal substrate and one or more cover layers made of a secondary metal that is more corrosion resistant to salt than the primary metal substrate in the core layer. Similarly, the diffusion surface alloyed metal sheet forming at least part of the inner wall can include a core layer made of the primary metal substrate and one or more cover layers made of a secondary metal that is more corrosion resistant to urea than the primary metal substrate in the core layer.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Figure 1:
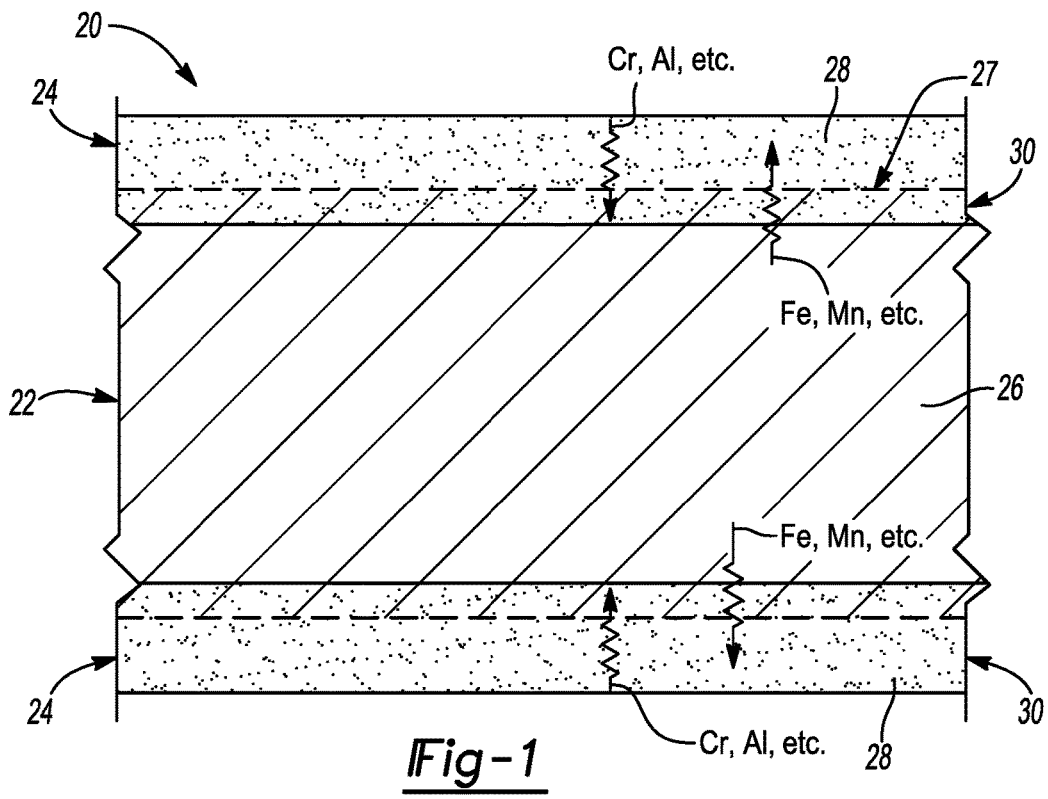
FIG. 1 is an enlarged, fragmentary cross-sectional view of a diffusion surface alloyed metal sheet constructed in accordance with the present disclosure.

Referring to the Figures, wherein like numerals indicate corresponding parts throughout the several views, various exhaust components 10, 110, 210, 310, 410, 510 for motor vehicles are illustrated where at least part of each exemplary exhaust component is constructed from a diffusion surface alloyed metal sheet 20.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 is an enlarged cross-sectional view of a diffusion surface alloyed metal sheet 20. The diffusion surface alloyed metal sheet 20 in this illustration is comprised of a core layer 22 that is positioned between two cover layers 24. The core layer 22 is made of a primary metal substrate 26 such as carbon steel or stainless steel having a chromium content of approximately 10 percent. The cover layers 24 cover at least part of original substrate surface 27 of the primary metal substrate 26. The cover layers 24 are made of a secondary metal 28 and are formed by surface diffusion of chromium (Cr) into the metal substrate 26. In embodiments where the primary metal substrate 26 is a stainless steel having a primary metal chromium content of at least 10 percent, the core layer 22 can be either ferritic stainless steel or austenitic stainless steel. It should be appreciated that the stainless steel is different from carbon/low carbon steels, which have a chromium content that is well below 10 percent. The secondary metal 28 in the cover layers 24 is a chromium rich metal or chromium rich alloy having a chromium content of at least 20 percent. The diffusion surface alloyed metal sheet 20 includes two transition zones 30 positioned between the core layer 22 and the cover layers 24, which are formed by inward-diffusion of the supplied elements, e.g. chromium (Cr) and/or aluminum (Al), into the metal substrate 26 and outward-diffusion of the elements from the primary metal substrate 26, e.g. iron (Fe) and manganese (Mn). Within the transition zone 30 a molecular concentration of the secondary metal 28 gradually decreases and a molecular concentration of the primary metal substrate 26 gradually increases moving toward the core layer 22. As a result, there is a gradual change in the chemistry, and properties of the diffusion surface alloyed metal sheet 20 in the transition zones 30. It should be appreciated that the two cover layers 24 may be made of the same secondary metal 28 or alternatively the cover layer 24 on one side of the core layer 22 may be made of a first secondary metal 28 while the cover layer 24 on the opposing side of the core layer 22 is made of a second secondary metal 28 that is different than the first secondary metal 28. It should also be appreciated that diffusion surface alloyed metal sheet 20 could alternatively include one cover layer 24 on just one side of the core layer 22.

It should be appreciated that the two cover layers 24 may be made of the same secondary metal 28 or alternatively the cover layer 24 on one side of the core layer 22 may be made of a first secondary metal 28 while the cover layer 24 on the opposing side of the core layer 22 is made of a second secondary metal 28 that is different than the first secondary metal 28. It should also be appreciated that the diffusion surface alloyed metal sheet 20 could alternatively include one cover layer 24 on just one side of the core layer 22.

There are a variety of manufacturing processes that can be used to form the diffusion surface alloyed metal sheet 20. In one exemplary process for creating metallurgically bonded metal, the chromium in the secondary metal 28 is applied in a slurry system to a sheet of the primary metal substrate 26. The sheet of the primary metal substrate 26 with the slurry is then rolled up and heated (baked) using an oven or other heating equipment. The combination of the slurry configuration, controlled atmosphere, and heat leads to formation of the secondary metal 28. It should be appreciated that diffusion surface alloyed metal sheets 20 are different from hot dip coated or cladded metal sheets. Hot dip coated or cladded metal sheets include an outer layer that remains mostly as supplied and the bond between the base metal substrate and the outer layer is highly localized. As a result, the molecular concentration of the outer layer material and the base metal substrate change abruptly at the boundary between the outer layer material and the base metal substrate. There is no transition zone where the chemistry, and properties of the metal sheet change gradually between the layers. The distinct layers are bonded together with a sharp interface that can cause a loose adhesion, which further impacts durability, especially during forming operations that are performed post-coating/cladding. This problem can be avoided with diffusion surface alloyed metal sheets 20.

The secondary metal 28 in the diffusion surface alloyed metal sheet 20 described herein has a higher chromium content than the carbon steel or stainless steel forming the primary metal substrate 26 such that the secondary metal 28 is more corrosion resistant to salt and urea than the carbon steel or stainless steel forming the primary metal substrate 26. However, to use diffusion surface alloyed metal sheets 20 in exhaust components, the diffusion surface alloyed metal sheets 20 must be cut, stamped, or undergo other manufacturing or forming operations that leave one or more edges 32. The edges 32 of diffusion surface alloyed metal sheets 20 provide an entry point for corrosion where the primary metal substrate 26 of the core layer 22 is left exposed (i.e., uncovered by the secondary metal 28). To prevent corrosion from occurring at one or more edges 32 of the diffusion surface alloyed metal sheet 20, the exhaust components 10, 110, 210, 310, 410, 510 described herein orientate the edges 32 of the diffusion surface alloyed metal sheet 20 toward a zone/chamber inside the exhaust component that is isolated from corrosive environments, including the outside environment (water and salt spray) and exhaust gases (water vapor and urea).

Figure 2:
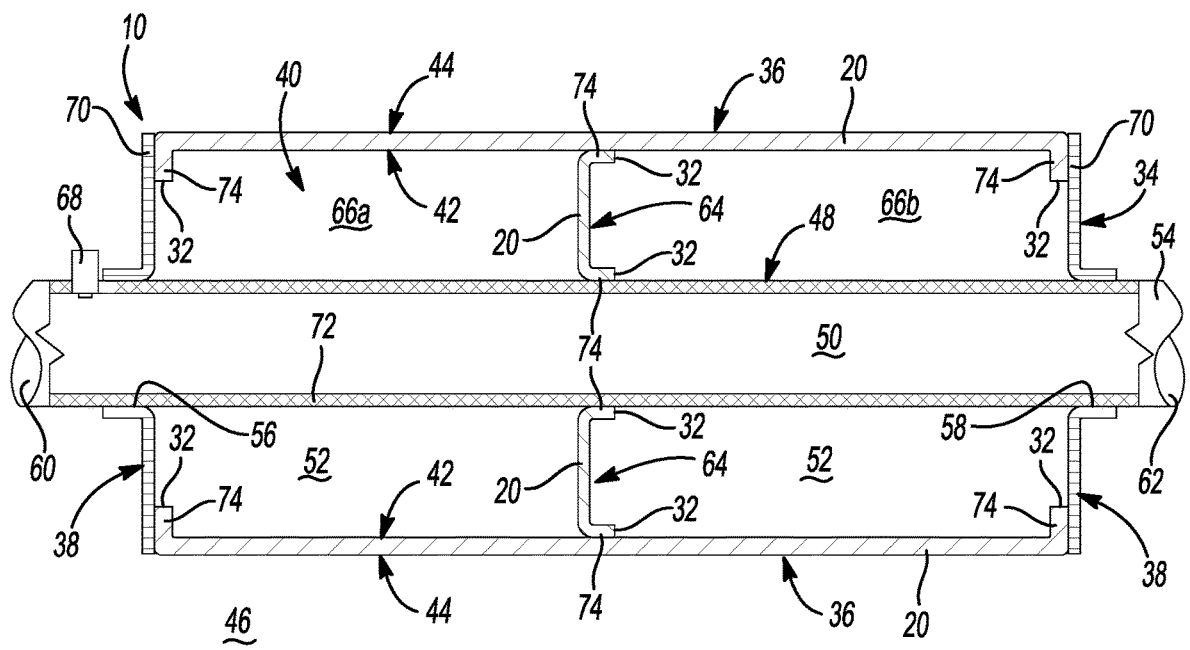
FIG. 2 is an exemplary exhaust component constructed in accordance with the present disclosure, where part of the exhaust component is constructed from the diffusion surface alloyed metal sheet shown in FIG. 1.

The exhaust component 10 shown in FIG. 2 includes a housing 34 with an outer wall 36 and two end walls 38 that cooperate to define an internal volume 40 of the housing 34. The outer wall 36 has an inside surface 42 facing the internal volume 40 of the housing 34 and an outside surface 44 facing an external zone 46 that is positioned outside the housing 34. The exhaust component 10 further includes an inner wall 48, positioned in the internal volume 40 of the housing 34, that divides the internal volume 40 into an exhaust chamber 50 and an interior chamber 52. In FIG. 2, the inner wall 48 is formed by a tube 54 that extends through an inlet opening 56 and an outlet opening 58 in the end walls 38 of the housing 34. The tube 54 defines the exhaust chamber 50 therein and extends between an inlet 60 where exhaust gases enter the exhaust chamber 50 and an outlet 62 where exhaust gases exit the exhaust chamber 50. Optionally, one or more partitions 64 may be installed in the interior chamber 52. The partitions 64 divide the interior chamber 52 into one or more segments 66a, 66b and can help support the tube 54 within the housing 34.

A urea injector 68 is positioned at the inlet 60 of the tube 54. The urea injector 68 is configured to inject urea (e.g., liquid $NH_3$ or gaseous $NH_3$) into the flow of exhaust gases passing through the tube 54. This urea is utilized in an emission control process for the treatment of diesel engine exhaust that takes place in a selective catalytic reduction (SCR) unit. The interior chamber 52 of the housing 34 is isolated from air, water, salt, and other contaminants in the external zone 46 by the outer wall 36 and end walls 38. The interior chamber 52 is isolated from exhaust gases, water vapor, urea, and other contaminants in the exhaust chamber 50 by the inner wall 48. Accordingly, the interior chamber 52 is a corrosion free zone inside the housing 34. The secondary metal 28 in the diffusion surface alloyed metal sheet 20 can also be configured to help protect the core layer 22 from direct exposure to elevated exhaust temperatures. The interior chamber 52 will typically have a cooler operating temperature than the exhaust chamber 50 and the side of the diffusion surface alloyed metal sheet 20 that faces the exhaust chamber 50 can be configured to include a cover layer 24 with a secondary metal 28 that can survive high temperatures (i.e., a material with high heat resistance) to protect the primary metal substrate 26 in the core layer 22.

Although other configurations are possible, the end walls 38 of the housing 34 are made of a salt resistant metal 70 such as 409 stainless steel and the tube 54 is made of a urea and salt resistant metal 72 such as 309 austenitic stainless steel or 439 stainless steel. The outer wall 36 of the housing 34 and the partitions 64 are made of diffusion surface alloyed metal sheets 20. As previously described, the diffusion surface alloyed metal sheets 20 include a secondary metal 28 that is formed to a primary metal substrate 26 by diffusion. The diffusion surface alloyed metal sheets 20 forming the outer wall 36 and the partitions 64 have edges 32 that are oriented toward and are exposed to the interior chamber 52 such that the primary metal substrate 26 at the edges 32 of the diffusion surface alloyed metal sheets 20 are protected from exposure to salt in the external zone 46 and exposure to urea in the exhaust chamber 50. Specifically, the edges 32 of the diffusion surface alloyed metal sheets 20 forming the outer wall 36 and the partitions 64 are bent inwardly into the interior chamber 52 at an angle of approximately 90 degrees to form inwardly turned flanges 74.

Figure 3:
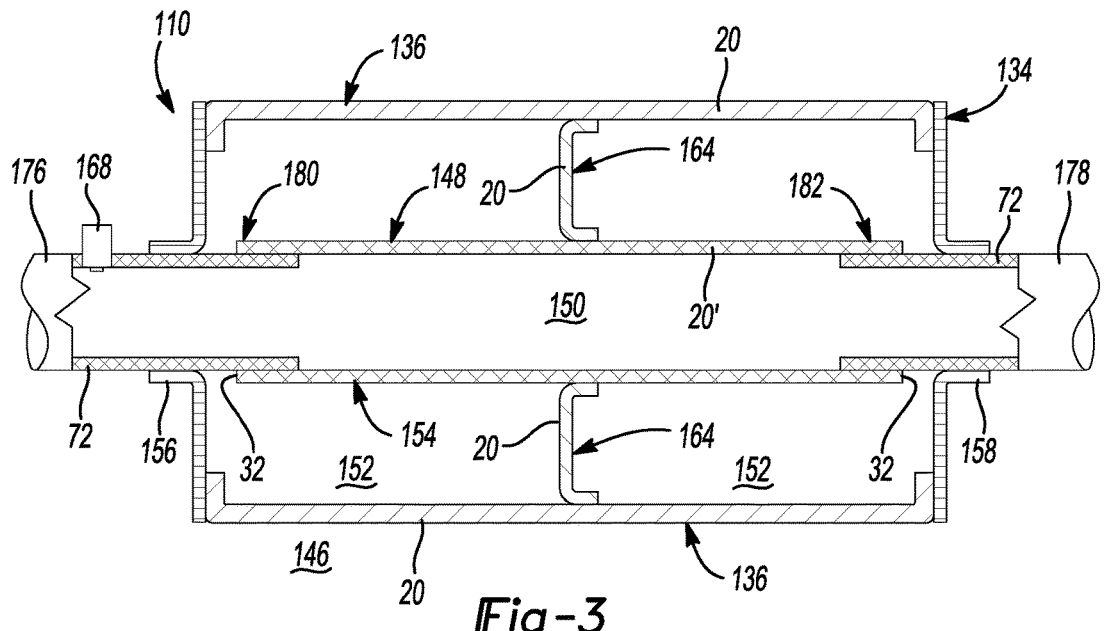
FIG. 3 is another exemplary exhaust component constructed in accordance with the present disclosure, where part of the exhaust component is constructed from the diffusion surface alloyed metal sheet shown in FIG. 1.

FIG. 3 illustrates an alternative configuration for an exhaust component 110 where the tube 54 in the exhaust component 10 shown in FIG. 2 is replaced with three components 154, 176, 178. The other features of the exhaust component 110 shown in FIG. 3 are the same as those described above in connection with the exhaust component 10 shown in FIG. 2. The exhaust component 110 shown in FIG. 3 includes an inlet conduit 176 that extends into a flanged inlet opening 156 in housing 134 and an outlet conduit 178 that extends into a flanged outlet opening 158 in the housing 134. The exhaust component 110 includes an inner wall 148 in the form of a tube 154 that extends between the inlet conduit 176 and the outlet conduit 178. The tube 154 defines the exhaust chamber 150 therein and the inlet conduit 176 and the outlet conduit 178 are arranged in fluid communication with the exhaust chamber 150. The tube 154 includes an inlet end 180 that receives part of the inlet conduit 176 in an overlapping relationship and an outlet end 182 that receives part of the outlet conduit 178 in an overlapping relationship. As a result, the inlet end 180 of the tube 154 extends annularly about and supports an outer circumference of the inlet conduit 176. Similarly, the outlet end 182 of the tube 154 extends annularly about and supports an outer circumference of the outlet conduit 178.

A urea injector 168 is placed in the inlet conduit 176 and the inlet and outlet conduits 176, 178 are made of a urea and salt resistant metal 72. Like in the exhaust component 10 shown in FIG. 2, the outer wall 136 and the partitions 164 of the exhaust component 110 shown in FIG. 3 are made from diffusion surface alloyed metal sheets 20. In addition to these walls, the inner wall 148 in FIG. 3 is also made from a diffusion surface alloyed metal sheet 20'. For example, a diffusion surface alloyed metal sheet 20' can be rolled into tube 154. The secondary metal 28 in the diffusion surface alloyed metal sheet 20 forming the outer wall 136 and partitions 164 is selected to be more corrosion resistant to salt than the primary metal substrate 26 in the core layer 22. The secondary metal 28 in the diffusion surface alloyed metal sheet 20' forming the inner wall 148 is selected to be more corrosion resistant to urea than the primary metal substrate 26 in the core layer 22. In other words, the secondary metal 28 used in the diffusion surface alloyed metal sheets 20 for the outer wall 136 and the partitions 164 can be selected particularly for its corrosion resistance to salt while the secondary metal 28 used in the diffusion surface alloyed metal sheets 20' for the inner wall 148 can be selected particularly for its corrosion resistance to urea. The result is an exhaust component 110 with walls 136, 148, 164 made of diffusion surface alloyed metal sheets 20, 20' that are tailored to the different corrosive environments in the external zone 146 outside the housing 134 and the exhaust chamber 150 inside the housing 134. Because the inlet and outlet ends 180, 182 of the tube 154 extend over the inlet and outlet conduits 176, 178, the edges 32 of the diffusion surface alloyed metal sheet 20' forming the inner wall 148 are exposed to the interior chamber 152 instead of the exhaust chamber 150 to eliminate an entry point for corrosion.

Figure 4:
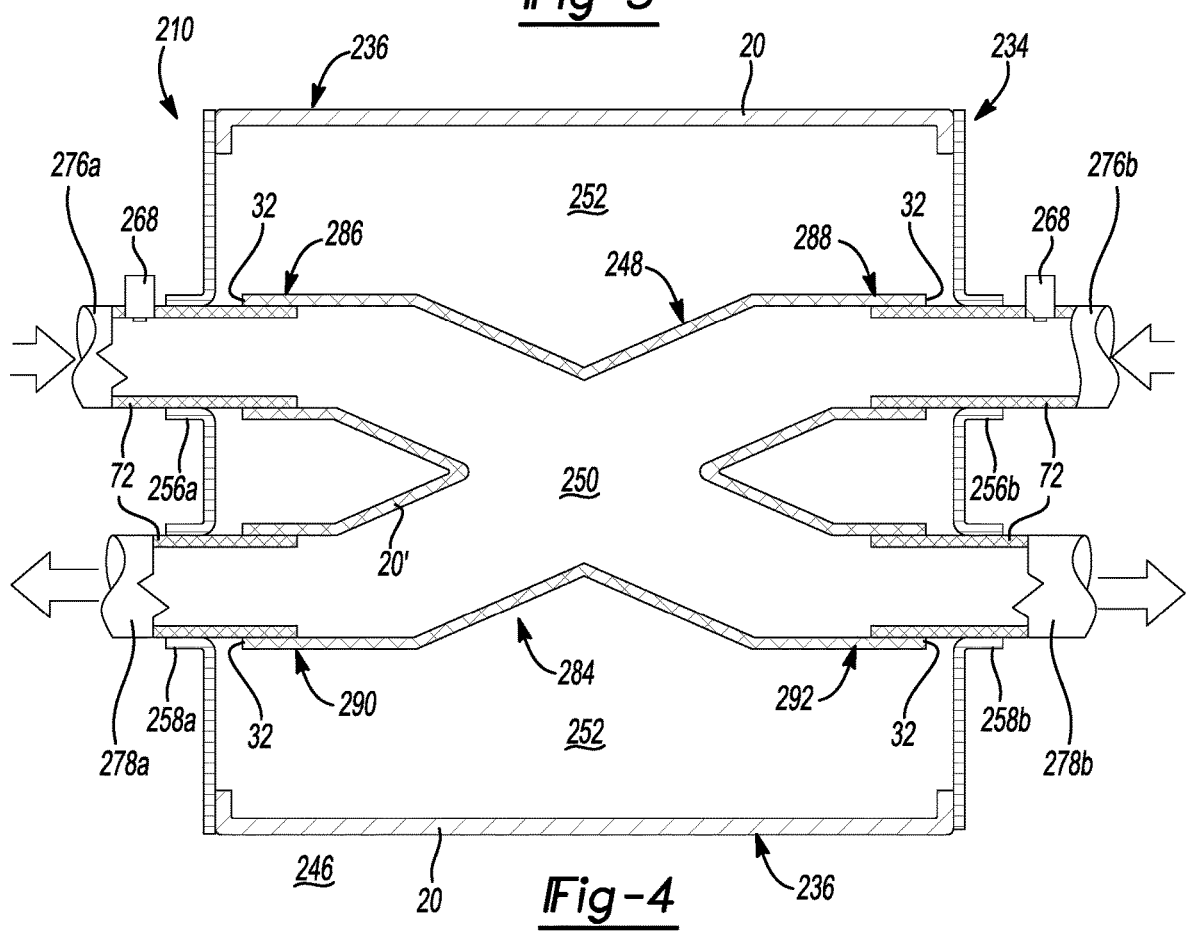
FIG. 4 is another exemplary exhaust component constructed in accordance with the present disclosure, where part of the exhaust component is constructed from the diffusion surface alloyed metal sheet shown in FIG. 1.

FIG. 4 illustrates an alternative configuration for an exhaust component 210 where the tube 154 in the exhaust component 110 shown in FIG. 3 is replaced with an inner wall 248 that is formed as an X-pipe 284 (sometimes referred to as a cross-pipe, cross-over pipe, balance pipe, H-pipe, or Y-pipe). The other features of the exhaust component 210 shown in FIG. 4 are the same as those described above in connection with the exhaust components 10, 110 shown in FIGS. 2 and 3. The exhaust component 210 shown in FIG. 4 includes a first inlet conduit 276a extending into a first inlet opening 256a in the housing 234 and a second inlet conduit 276b extending into a second inlet opening 256b in the housing 234. Each of the first and second inlet conduits 276a, 276b may include a urea injector 268. The exhaust component 210 further includes a first outlet conduit 278a extending into a first outlet opening 258a in the housing 234 and a second outlet conduit 278b extending into a second outlet opening 258b in the housing 234. The x-pipe 284 is positioned within the housing 234 and defines an exhaust chamber 250 therein. The first and second inlet conduits 276a, 276b and the first and second outlet conduits 278a, 278b are arranged in fluid communication with the exhaust chamber 250.

The x-pipe 284 extends between the first and second inlet conduits 276a, 276b and the first and second outlet conduits 278a, 278b. More specifically, the x-pipe 284 includes a first end 286 that receives part of the first inlet conduit 276a in an overlapping relationship, a second end 288 that receives part of the second inlet conduit 276b in an overlapping relationship, a third end 290 that receives part of the first outlet conduit 278a in an overlapping relationship, and a fourth end 292 that receives part of the second outlet conduit 278b in an overlapping relationship. As a result, the first and second ends 286, 288 of the x-pipe 284 extend annularly about and support the outer circumferences of the first and second inlet conduits 276a, 276b. Similarly, the third and fourth ends 290, 292 of the x-pipe 284 extend annularly about and support the outer circumferences of the first and second outlet conduits 278a, 278b.

The first and second inlet conduits 276a, 276b and the first and second outlet conduits 278a, 278b may be made of a urea and salt resistant metal 72. Like in the exhaust components 10, 110 shown in FIGS. 2 and 3, the outer wall 236 of the exhaust component 210 shown in FIG. 4 is made from a diffusion surface alloyed metal sheet 20. In addition to the outer wall 236, the inner wall 248 in FIG. 4 is also made from a diffusion surface alloyed metal sheet 20'. For example, a diffusion surface alloyed metal sheet 20' can be stamped into two halves that cooperate to form the x-pipe 284 in a clam-shell arrangement. The secondary metal 28 in the diffusion surface alloyed metal sheet 20 forming the outer wall 236 is selected to be more corrosion resistant to salt than the primary metal substrate 26 in the core layer 22. The secondary metal 28 in the diffusion surface alloyed metal sheet 20' forming the inner wall 248 is selected to be more corrosion resistant to urea than the primary metal substrate 26 in the core layer 22. In other words, the secondary metal 28 used in the diffusion surface alloyed metal sheet 20 for the outer wall 236 can be selected particularly for its corrosion resistance to salt while the secondary metal 28 used in the diffusion surface alloyed metal sheet 20' for the inner wall 248 can be selected particularly for its corrosion resistance to urea. The result is an exhaust component 210 with walls 236, 238 made of diffusion surface alloyed metal sheets 20, 20' that are tailored to the different corrosive environments in the external zone 246 outside the housing 234 and the exhaust chamber 250 inside the housing 234. Because the ends 286, 288, 290, 292 of the x-pipe 284 extend over the inlet and outlet conduits 276a, 276b, 278a, 278b, the edges 32 of the diffusion surface alloyed metal sheet 20' forming the inner wall 248 are exposed to the interior chamber 252 instead of the exhaust chamber 250 to eliminate an entry point for corrosion.

Figure 5:
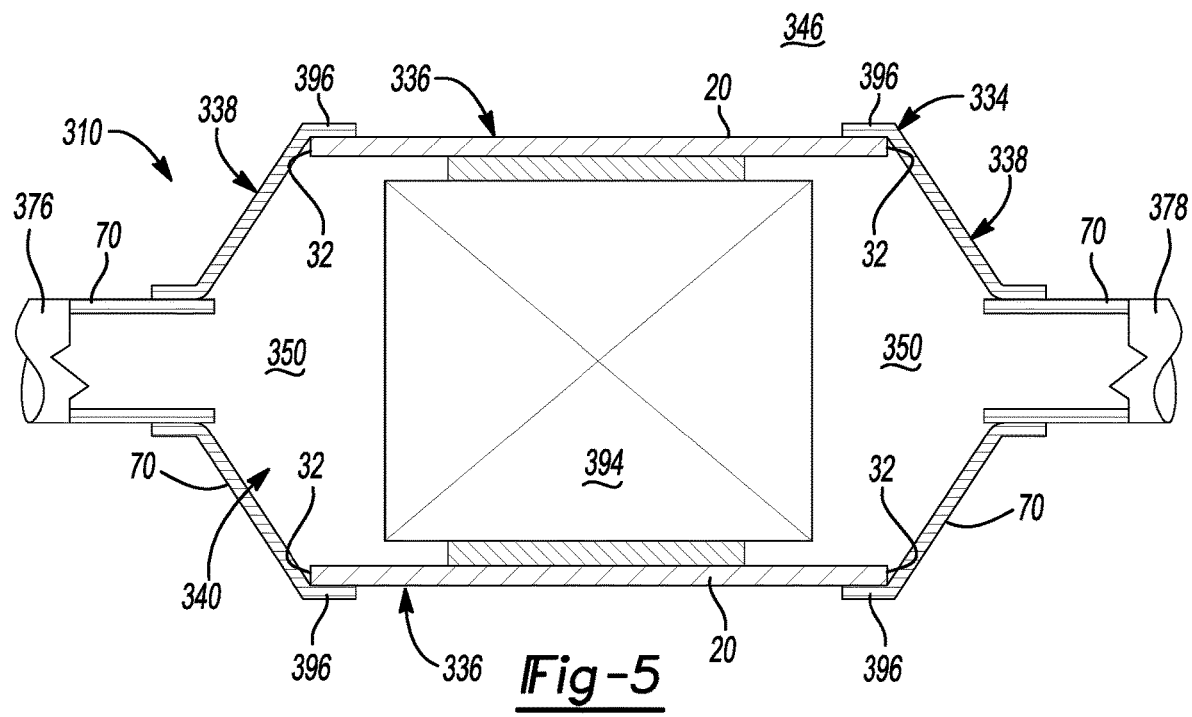
FIG. 5 is another exemplary exhaust component constructed in accordance with the present disclosure, where the exhaust component houses a diesel oxidation catalyst (DOC) and part of the exhaust component is constructed from the diffusion surface alloyed metal sheet shown in FIG. 1.

FIG. 5 illustrates an alternative configuration for an exhaust component 310 where the tube 254 and partitions 264 in the exhaust component 210 shown in FIG. 3 are replaced with a diesel oxidation catalyst 394 (DOC). The other features of the exhaust component 310 shown in FIG. 5 are the same as those described above in connection with the exhaust components 10, 110 shown in FIGS. 2 and 3. The exhaust component 310 shown in FIG. 5 includes end walls 338 that have a frusto-conical (i.e., funnel) shape and the exhaust chamber 350 occupies the entire internal volume 340 of the housing 334. The diesel oxidation catalyst 394 is positioned and supported within the internal volume 340 of the housing 334. Flanges 396 extend from the end walls 338 over an outer wall 336 of the housing 334. The configuration shown in FIG. 5 is not intended for use in applications where urea is injected into the exhaust gases. Therefore, the end walls 338, the inlet conduit 376, and the outlet conduit 378 are made of a salt resistant metal 70.

In accordance with the configuration shown in FIG. 5, the outer wall 336 is made of a diffusion surface alloyed metal sheet 20. The secondary metal 28 in the diffusion surface alloyed metal sheet 20 is selected for corrosion resistance to salt. The edges 32 of the diffusion surface alloyed metal sheet 20 forming the outer wall 336 are oriented toward and are exposed to the internal volume 340 such that the primary metal substrate 26 at the edges 32 of the diffusion surface alloyed metal sheet 20 are protected from exposure to the salt environment in the external zone 346. More specifically, the flanges 396 of the end walls 338 extend over the edges 32 of the diffusion surface alloyed metal sheet 20 forming the outer wall 336 and therefore isolate the edges 32 from the external zone 346 outside the housing 334. It should be appreciated that the diesel oxidation catalyst 394 (DOC) shown in FIG. 5 could alternatively be replaced with a selective catalytic reduction (SCR) unit, a diesel particulate filter (DPF), ammonia slip catalyst (ASC), or similar emissions control devices).

Figure 6:
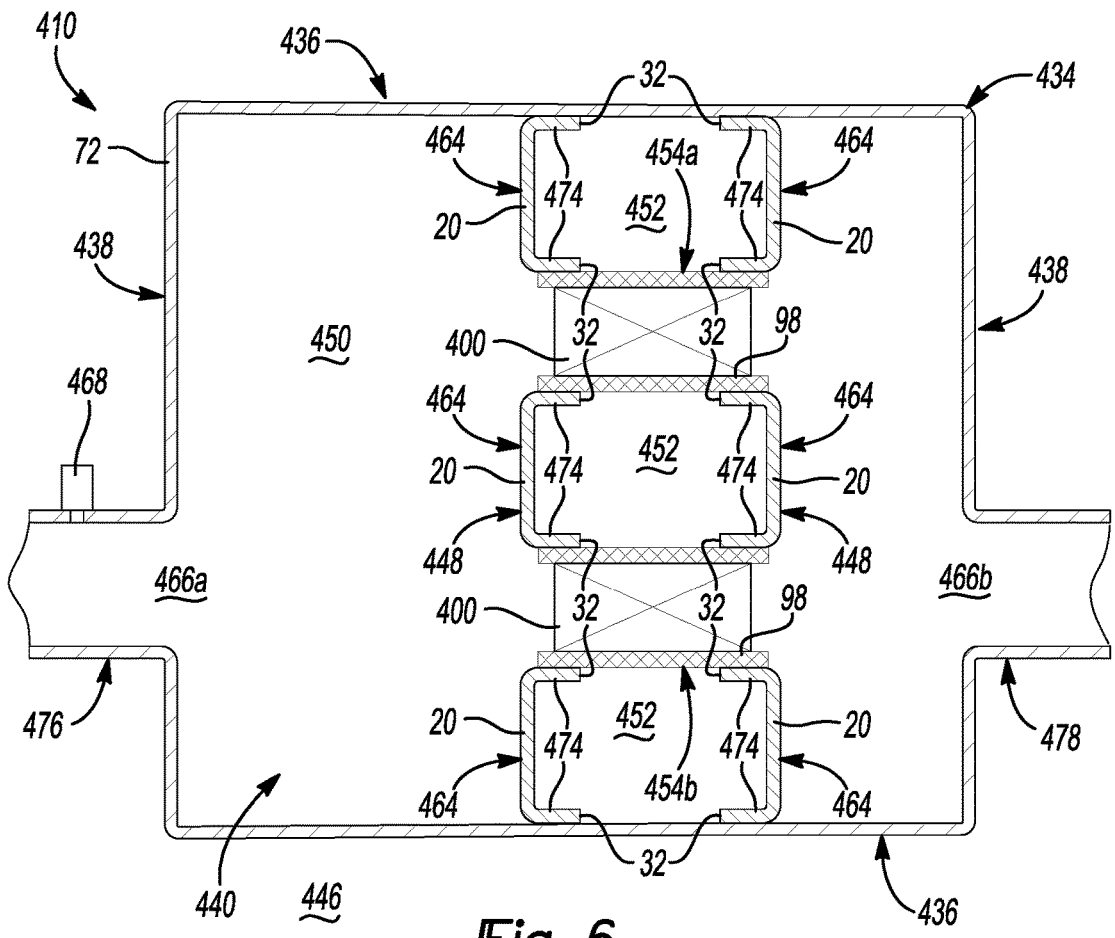
FIG. 6 is another exemplary exhaust component constructed in accordance with the present disclosure, where the exhaust component houses two selective catalytic reduction (SCR) units and part of the exhaust component is constructed from the diffusion surface alloyed metal sheet shown in FIG. 1.

FIG. 6 illustrates an alternative configuration for an exhaust component 410 where the tube 154 in the exhaust component 110 shown in FIG. 3 is replaced with tubes 454a, 454b. In the exhaust component 410 shown in FIG. 6, the partitions 464 in combination with the tubes 454a, 454b define interior chambers 452 that are isolated from exhaust chamber 450, which fills the remaining space of the internal volume 440. The other features of the exhaust component 410 shown in FIG. 6 are the same as those described above in connection with the exhaust components 10, 110 shown in FIGS. 2 and 3. A urea injector 468 is placed in the inlet conduit 476. The inlet and outlet conduits 476, 478, the end walls 438 of the housing 434, and the outer wall 436 of the housing 434 of the exhaust component 410 shown in FIG. 6 are all made of a urea and salt resistant metal 72. Selective catalytic reduction (SCR) units 400 are positioned within the tubes 454a, 454b. The tubes 454a, 454b are made of a urea resistant metal 98 such as 449 stainless steel. The tubes 454a, 454b and thus the selective catalytic reduction (SCR) units 400 are supported in the internal volume 440 of the housing 434 by the partitions 464, which form inner walls 448 in the housing 434 that divide the internal volume 440 into an exhaust chamber 450 and interior chambers 452 that are isolated from the external zone 446 and the exhaust chamber 450. The partitions 464 and the selective catalytic reduction (SCR) units 400 together divide the exhaust chamber 450 into first and second segments 466a, 466b.

Like in the exhaust components 10, 110 shown in FIGS. 2 and 3, the partitions 464 of the exhaust component 410 shown in FIG. 6 are made from diffusion surface alloyed metal sheets 20. The secondary metal 28 in the diffusion surface alloyed metal sheet 20 forming the inner wall 448 is selected to be more corrosion resistant to urea than the primary metal substrate 26 in the core layer 22. In other words, the secondary metal 28 used in the diffusion surface alloyed metal sheets 20 for the partitions 464 can be selected particularly for its corrosion resistance to urea. In addition, the diffusion surface alloyed metal sheets 20 forming the partitions 464 have edges 32 that are oriented toward and are exposed to the interior chambers 452 such that the primary metal substrate 26 at the edges 32 of the diffusion surface alloyed metal sheets 20 are protected from exposure to urea in the exhaust chamber 450. Specifically, the edges 32 of the diffusion surface alloyed metal sheets 20 forming the partitions 464 are bent inwardly into the interior chambers 452 at an angle of approximately 90 degrees to form inwardly turned flanges 474.

Figure 7:
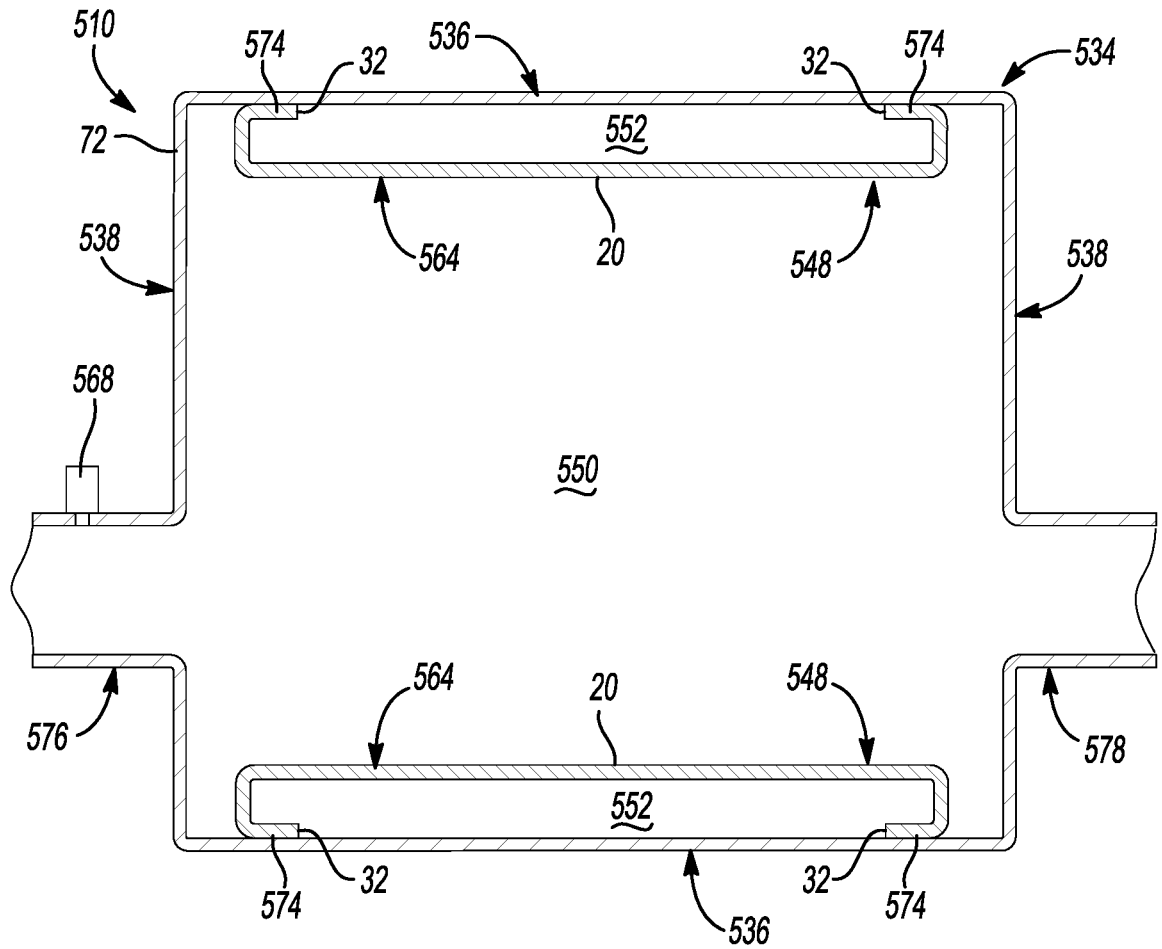
FIG. 7 is another exemplary exhaust component constructed in accordance with the present disclosure, where part of the exhaust component is constructed from the diffusion surface alloyed metal sheet shown in FIG. 1.

FIG. 7 illustrates an alternative configuration for an exhaust component 510 where the tubes 454 and the selective catalytic reduction (SCR) units 400 of the exhaust component 410 shown in FIG. 6 are removed and partitions 564 defining an interior chamber 552 near the outer wall 536. The other features of the exhaust component 510 shown in FIG. 7 are the same as those described above in connection with the exhaust component 410 shown in FIG. 6. A urea injector 568 is placed in the inlet conduit 576. The inlet and outlet conduits 576, 578, the end walls 538 of the housing 534, and the outer wall 536 of the housing 534 of the exhaust component 510 shown in FIG. 7 are all made of a urea and salt resistant metal 72. The partitions 564 of the exhaust component 510 shown in FIG. 7, which form the inner wall 548, are made from diffusion surface alloyed metal sheets 20. The secondary metal 28 in the diffusion surface alloyed metal sheet 20 forming the inner wall 548 is selected to be more corrosion resistant to urea than the primary metal substrate 26 in the core layer 22. In other words, the secondary metal 28 used in the diffusion surface alloyed metal sheets 20 for the partitions 564 can be selected particularly for its corrosion resistance to urea. The diffusion surface alloyed metal sheets 20 forming the partitions 564 have edges 32 that are oriented toward and are exposed to the interior chamber 552 such that the primary metal substrate 26 at the edges 32 of the diffusion surface alloyed metal sheets 20 are protected from exposure to urea in the exhaust chamber 550. In accordance with this configuration, the edges 32 of the diffusion surface alloyed metal sheets 20 forming the partitions 564 are bent inwardly into the interior chamber 552 at an angle of approximately 180 degrees and therefore form inwardly turned flanges 574 that have a U-like shape. The interior chamber 552 may be empty (i.e., air filled) or alternatively may be filled with an insulation layer.

Many other modifications and variations of the present disclosure are possible in light of the above teachings and may be practiced otherwise than as specifically described while within the scope of the appended claims.

What is claimed is:

1. An exhaust component for a motor vehicle, comprising:
a housing including at least one outer wall defining an internal volume of said housing;
said at least one outer wall having an inside surface facing said internal volume of said housing and an outside surface facing an external zone positioned outside of said housing;
at least one inner wall positioned in said internal volume of said housing that divides said internal volume into an exhaust chamber and an interior chamber;
said interior chamber being isolated from constituents in said external zone by said at least one outer wall and from constituents in said exhaust chamber by said at least one inner wall;
at least part of one of said outer and inner walls being made of a diffusion surface alloyed metal sheet comprising a secondary metal that is formed to a primary metal substrate by diffusion;
wherein said at least one inner wall includes at least one partition that is made of said diffusion surface alloyed metal sheet, said at least one partition completely dividing said interior chamber into first and second segments; and
said diffusion surface alloyed metal sheet including at least one edge that is oriented toward and exposed to said interior chamber such that said primary metal substrate at said at least one edge of said diffusion surface alloyed metal sheet is protected from exposure to at least one of said external zone and said exhaust chamber.

2. The exhaust component set forth in claim 1, wherein said diffusion surface alloyed metal sheet includes a core layer made of said primary metal substrate that is positioned between two cover layers made of said secondary metal.

3. The exhaust component set forth in claim 2, wherein said diffusion surface alloyed metal sheet includes transition zones between said core layer and said cover layers where a molecular concentration of said secondary metal gradually decreases and a molecular concentration of said primary metal substrate gradually increases moving toward said core layer.

4. The exhaust component set forth in claim 1, further comprising:
an inlet conduit extending into an inlet opening in said housing;
an outlet conduit extending into an outlet opening in said housing; and
said inlet conduit and said outlet conduit being arranged in fluid communication with said exhaust chamber.

5. The exhaust component set forth in claim 4, wherein said at least one inner wall includes a tube that extends between said inlet conduit and said outlet conduit, said tube including an inlet end that receives part of said inlet conduit in an overlapping relationship and an outlet end that receives part of said outlet conduit in an overlapping relationship.

6. The exhaust component set forth in claim 1, wherein said at least one inner wall includes a tube that extends through said housing from an inlet to an outlet and defines said exhaust chamber therein.

7. The exhaust component set forth in claim 1, further comprising:
a first inlet conduit extending into a first inlet opening in said housing;
a second inlet conduit extending into a second inlet opening in said housing;
a first outlet conduit extending into a first outlet opening in said housing;
a second outlet conduit extending into a second outlet opening in said housing;
said first and second inlet conduits and said first and second outlet conduits being arranged in fluid communication with said exhaust chamber; and
said at least one inner wall including an x-pipe that extends between said first and second inlet conduits and said first and second outlet conduits, said x-pipe including a first end that receives part of said first inlet conduit in an overlapping relationship, a second end that receives part of said second inlet conduit in an overlapping relationship, a third end that receives part of said first outlet conduit in an overlapping relationship, and a fourth end that receives part of said second outlet conduit in an overlapping relationship.

8. The exhaust component set forth in claim 1, wherein said primary metal substrate is stainless steel and said secondary metal is a metal having a higher chromium content than said stainless steel forming said primary metal substrate such that said secondary metal is more corrosion resistant to salt and urea than said stainless steel forming said primary metal substrate.

9. The exhaust component set forth in claim 1, wherein said at least one edge of said diffusion surface alloyed metal sheet is bent inwardly into said interior chamber.

10. The exhaust component set forth in claim 1, wherein at least part of said outer wall is made of said diffusion surface alloyed metal sheet.

11. The exhaust component set forth in claim 1, wherein at least part of said inner wall is made of said diffusion surface alloyed metal sheet.

12. The exhaust component set forth in claim 1, wherein at least part of said outer wall and at least part of said inner wall are made of one or more diffusion surface alloyed metal sheets.

13. The exhaust component set forth in claim 1, wherein said at least one partition further divides said exhaust chamber into first and second segments.

14. The exhaust component set forth in claim 1, further comprising:
a diesel oxidation catalyst positioned within said internal volume of said housing.

15. The exhaust component set forth in claim 1, further comprising:
at least one selective catalytic reduction (SCR) unit positioned within said internal volume of said housing.

* * * * *